United States Patent [19]

Natarajan

[11] Patent Number: 5,452,294
[45] Date of Patent: Sep. 19, 1995

[54] METHOD AND APPARATUS FOR ADAPTIVE ROUTE SELECTION IN COMMUNICATION NETWORKS

[75] Inventor: Kadathur S. Natarajan, Mesa, Ariz.

[73] Assignee: Motorola, Inc., Schaumburg, Ill.

[21] Appl. No.: 270,976

[22] Filed: Jul. 5, 1994

[51] Int. Cl.6 ............................................. H04L 12/52
[52] U.S. Cl. ...................................... 370/54; 340/827; 370/58.1
[58] Field of Search ........................ 370/13, 16, 54, 60; 340/825.01, 826, 827; 379/113, 220, 221

[56] References Cited

U.S. PATENT DOCUMENTS

| | | | |
|---|---|---|---|
| 4,550,397 | 10/1985 | Turner et al. | 370/60 |
| 4,991,204 | 2/1991 | Yamamoto et al. | 340/827 |
| 4,999,829 | 3/1991 | Fite, Jr. et al. | 370/16 |
| 5,031,093 | 7/1991 | Hasegawa | 364/200 |
| 5,042,027 | 8/1991 | Takase et al. | 340/827 |
| 5,099,235 | 3/1992 | Crookshanks | 340/826 |
| 5,303,290 | 4/1994 | Redberg et al. | 379/221 |
| 5,321,815 | 6/1994 | Bartolanzo, Jr. et al. | 340/827 |
| 5,335,268 | 8/1994 | Kelly, Jr. et al. | 379/221 |
| 5,347,511 | 9/1994 | Gun | 370/54 |

*Primary Examiner*—Benedict V. Safourek
*Attorney, Agent, or Firm*—Sherry J. Whitney; Gregory J. Gorrie

[57] ABSTRACT

An apparatus and method for adaptive route selection between a source and a destination node where multiple routes are available. Link state variables are monitored and updated when call termination requests or call arrival requests are received. When a call arrival request is received, a list of potential routes between the source and destination nodes is determined. A best route is selected by evaluating the link states for each potential route. A call is attempted on the best route and if the attempt is not successful, a call is attempted using the next best route and so on.

22 Claims, 6 Drawing Sheets

METHOD AND APPARATUS FOR ADAPTIVE ROUTE SELECTION IN COMMUNICATION NETWORKS

FIELD OF THE INVENTION

The present invention relates generally to selecting data routes between one communication node and another in communication systems, and particularly to route selection where multiple routes are available between the one communication node and the other.

BACKGROUND OF THE INVENTION

A key problem in the design, operation, control, and management of a communication network system is the efficient routing of traffic between various source and destination node pairs in the network. Routing determines how efficiently the resources of a communication system are used to communicate data through the system. As defined herein, "communication data" and "traffic" refer to any type of data communicated between one node of a communication system and another (e.g., voice data, fax data, control data, etc.).

The problem of routing traffic through a network arises in different types of communication systems. These include terrestrial or land-based communication networks, satellite-based wireless communication networks, or hybrid mixed-media (terrestrial as well as satellite) types of systems.

FIG. 1 illustrates a prior art simplified diagram of a communication network. For the purpose of illustration of traffic routing, FIG. 1 shows a simplified routing system having multiple nodes 2-18 and communication links 20-42. As used herein, a "route" is a series of nodes (e.g., nodes 2-18) connected by communication links (e.g., communication links 20-42) and through which information may be transferred from a source node to a destination node. To establish a communication path between any two nodes 2-18, multiple routes may be available. For example, assume node 2 is a source node and node 10 is a destination node. Table 1 illustrates a set of possible routes available from node 2 to node 10.

TABLE 1

Possible Routes Between Node 2 and Node 10

| | | | | | | | | | | | | | | | | |
|---|---|---|---|---|---|---|---|---|---|---|---|---|---|---|---|---|
| Route 1: | 2 | → | 4 | → | 10 | | | | | | | | | | | |
| Route 2: | 2 | → | 4 | → | 6 | → | 12 | → | 10 | | | | | | | |
| Route 3: | 2 | → | 4 | → | 6 | → | 12 | → | 18 | → | 16 | → | 10 | | | |
| Route 4: | 2 | → | 4 | → | 6 | → | 12 | → | 18 | → | 16 | → | 14 | → | 8 | → | 10 |
| Route 5: | 2 | → | 8 | → | 10 | | | | | | | | | | | |
| Route 6: | 2 | → | 8 | → | 14 | → | 16 | → | 10 | | | | | | | |
| Route 7: | 2 | → | 8 | → | 14 | → | 16 | → | 18 | → | 12 | → | 10 | | | |
| Route 8: | 2 | → | 8 | → | 14 | → | 16 | → | 18 | → | 12 | → | 6 | → | 4 | → | 10 |

In typical systems, a set of possible routes for communicating between a particular source node and a particular destination node (e.g., between node 2 and node 10) is defined before system operation begins. This set may or may not include all possible routes. However, if no such set is defined, the set of possible routes may be taken to be the set of all possible routes between the source node and the destination node.

In FIG. 1, suppose a system user makes a request to establish a communication path (e.g., a call request) between node 2 and node 10. The call may be set up along Route 1 (Table 1) if both link 20 and link 26 are capable of supporting the call (i.e., links 20, 26 have resources available). If either link 20 or link 26 does not have adequate resources available, then the link is considered blocked at that particular time and Route 1 cannot support communication between node 2 and node 10. If both links 20, 26 have adequate resources at that time, the call may be set up along Route 1.

Resources on links 20, 26 will be consumed for the duration of the call. After the call completes, the resources along links 20, 26 will be relinquished for new calls to use. A subsequent call request from node 2 to node 10 may be set up using Route 1. Alternatively, another of the alternate routes may support the call. For example, Route 6 (Table 1) may support the call if links 24, 34, 40, 36 have resources available to allocate for the call.

Whenever a request to set up a call from one node to another node arrives, the system must select a route from the set of choices available and set up the connection between the two nodes.

One prior art method of route selection based on a set of possible routes is a "Random Route Selection" method. To illustrate this method, consider the system shown in FIG. 1. When a request to set up a call from node 2 to node 10 arrives, the system will choose one of the choices (Route 1 ... Route 8) at random and attempt to use that route. If adequate resources are available along that route, the call setup is successful. Otherwise, the call is blocked. The random choice is made with fixed probabilities that do not change with network traffic and load conditions.

For example, a system may have equal, fixed probabilities of choosing a particular route. Where eight routes are available, a 12.5% probability would exist that any one of the eight routes would be chosen. A system may, alternatively, have unequal, fixed probabilities that a particular route would be chosen. For example, a particular route may be preferred, thus have a higher probability of being chosen, because it contains fewer links.

Another method of route selection known in prior art is a "First Available Route Without Resequencing" method. Suppose the system of FIG. 1 receives a call request from node 2 to node 10. Each of the potential routes between node 2 and node 10 is "searched" in a fixed order. A search entails the system sending a route search control signal along a first choice (e.g., Route 1) and determining if resources are available on each link of the route. If resources are available, the call is set up along that route. Otherwise, a second choice (e.g., Route 2) is searched. The search continues until a route with adequate resources is discovered or all the routes are searched, but none have adequate resources. When no route has adequate resources, the call is blocked. This method is an exhaustive search procedure that ensures successful call setup provided a route with adequate resources is available.

Typical routing solutions as described above do not provide adequate service for a number of reasons. The Random Route Selection method is inadequate because it does not take traffic and load conditions into account. This leads to low system utilization. As a result, many more calls are blocked than is necessary and reduced revenues for the system service provider results.

The First Available Route Without Resequencing method makes route selections dependent on traffic conditions. However, it is slow in setting up calls because of the exhaustive nature of the search. Furthermore, the method can not be implemented in systems that do not support the fast exchange of route search control signals.

What is needed to overcome the deficiencies of methods known in prior art is a route selection method and apparatus that must:

a) fully utilize the available system resources to support as many calls as possible,
b) provide robust system performance under a wide range of traffic and load conditions,
c) be simple to implement and have low traffic overhead, and
d) have practical utility in a wide range of communication systems.

BRIEF DESCRIPTION OF THE DRAWING

The invention is pointed out with particularity in the appended claims. However, a more complete understanding of the present invention may be derived by referring to the detailed description and claims when considered in connection with the figures, wherein:

Figure 1:
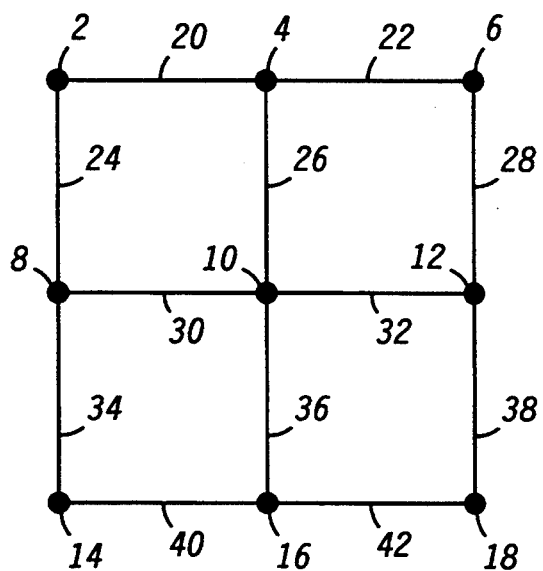
FIG. 1 illustrates a prior art simplified diagram of a communication network.

The exemplification set out herein illustrates the preferred embodiment of the invention in one form thereof, and such exemplification is not intended to be construed as limiting in any manner.

DETAILED DESCRIPTION OF THE DRAWING

Generally, the present invention provides an apparatus and method for adaptive route selection between one communication node and another where multiple routes are available. The present invention may be applied to any communication system with multiple nodes, including but not limited to: a) static, land-based communication systems, b) dynamic, space-based satellite communication systems, and c) hybrid land- and space-based communication systems.

The method for adaptive route selection is based on the idea of keeping track of the state of the communication system. The state of the system is an aggregate summary of the prevailing congestion conditions on the individual communication links of the system. The adaptive method is accomplished by automatic monitoring of the usage of communication links and maintaining an estimate of the congestion on each link. For each link, the system keeps an estimate of the probability of blocking on the link (i.e., the likelihood of the link not having adequate resources).

During normal operation, a sequence of call requests are placed on the system. Each call request asks the system to establish a communication path between a pair of nodes. With an estimated knowledge of the network state (i.e., the likelihood of being blocked on individual links), the system will be able to quickly assess the likelihood of adequate resources being available on any given route at any time instant.

The present invention enables the system to select adaptively from multiple route choices where available. In the preferred embodiment, the system makes a rapid assessment of the link congestion for a set of routes between a pair of nodes. From the assessment, the system determines the route which is most likely to have resources available (i.e., least likely to encounter blocking along the route). The route is selected as the best candidate among the set of routes between the pair of nodes and the call is set up using that best route. For this reason, the method of the preferred embodiment is called the Select Most Available Route method.

In an alternate embodiment, the system makes an assessment of the link congestion and determines bottlenecks (i.e., links with lowest available resources) along each route. The system then selects a route with the highest bottleneck value. The alternate embodiment method is called the Select Resequenced First Available Route method.

Figure 2:
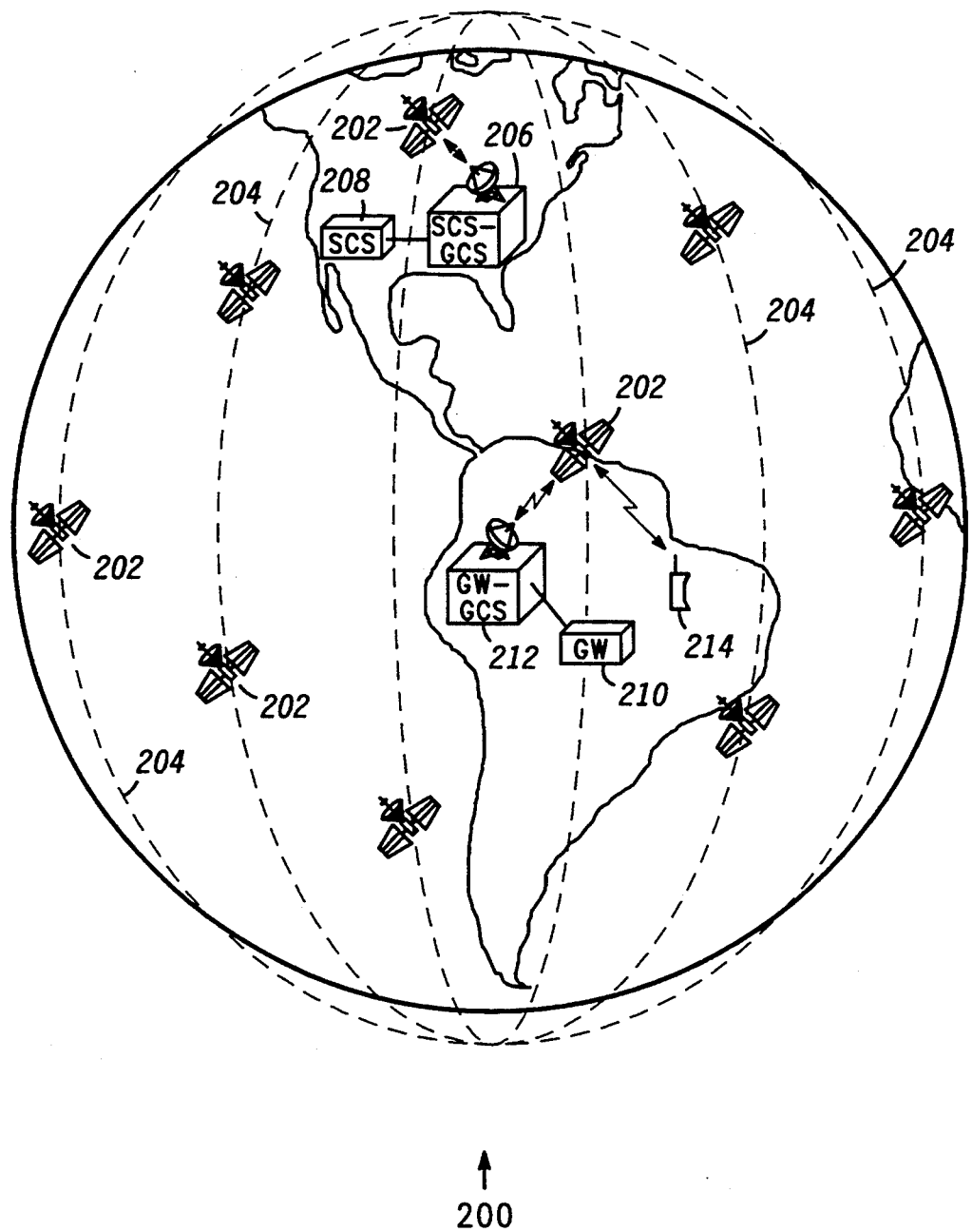
FIG. 2 illustrates a simplified diagram of a satellite-based communication network in accordance with the present invention.

FIG. 2 illustrates a simplified diagram of a satellite-based communication network in accordance with the present invention. Satellite-based, cellular communications system 200 is dispersed over and surrounding a celestial body (e.g., earth) through use of orbiting satellites 202. Satellites 202 occupy orbits 204 that may be low-earth orbits, medium-earth orbits, geosynchronous orbits, or a combination thereof. Low-earth orbits are generally at an altitude of about 600 km to 2000 km, medium-earth orbits at about 2000 km to 20,000 km and geosynchronous orbits at about 42,165 km, but other altitudes can also be used. In the example shown, communications system 200 uses six polar orbit planes, with each orbit plane holding eleven satellites 202 for a total of sixty-six satellites 202. However, this is not essential and more or fewer satellites, or more or fewer orbit planes or combinations of orbiting and geosynchronous satellites, may be used. For clarity, FIG. 2 illustrates only a few of satellites 202.

Satellites 202 communicate with terrestrial equipment which may be, for example, a System Control Segment Ground Communication Station 206. A "Ground Communication Station" (GCS) is defined herein as a terrestrial communication facility capable of interfacing ground based equipment (e.g., System Control Segment 208) with satellites 202. FIG. 2 shows System Control Segment GCS 206 (SCS-GCS) associated with System Control Segment 208. SCS-GCSs 206 perform data transfer and telemetry, tracking, and control functions for the constellation of satellites 202.

A "System Control Segment" 208 (SCS) is defined herein as a control facility, typically ground-based, which controls operation of communication system 200.

SCS 208 communicates with the rest of communication system 200 via SCS-GCS 206. SCS 208 need not be co-located with SCS-GCS 206. SCS 208 is preferably coupled to SCS-GCS 206 via land-lines, although this is not essential. In an alternate embodiment, SCS 208 may be coupled to SCS-GCS 206 via fiber optic links, radio links or other transmission mediums.

In the preferred embodiment, SCS 208 typically maintains a database of state variables describing the current state of the communication system. The state variables desirably include, but are not limited to, data describing capacities of communication links between satellites 202, the current amount of traffic on those links, and data describing call setup attempts over the links and call setup failure rates. SCS 208 desirably distributes some or all of the state variable data to gateways 210. In an alternate embodiment, data describing state variables may be located in one or more system elements other than SCS 208 (e.g., gateways 210 or satellites 202). In another alternate embodiment, SCS 208 functions as a "Route Selection Controller", where a "Route Selection Controller" is defined herein as a control facility that determines a route for communications between a source node and a destination node based on the database of state variables.

A "Gateway" 210 (GW) is defined herein as an equipment facility, typically ground-based, which is capable of interfacing GW-GCS 212 (and thus satellites 202) with ground-based equipment such as, for example, a public switched telephone network (PSTN) or a ground-based cellular network, not shown. GWs 210 communicate with the rest of communication system 200 via GW-GCSs 212. GWs 210 need not be co-located with GW-GCSs 212. GWs 210 are preferably coupled to GW-GCSs 212 via land-lines, although this is not essential. In an alternate embodiment, GWs 210 may be coupled to GW-GCSs 212 via fiber optic links, radio links or other transmission mediums.

In the preferred embodiment, GWs 210 function as Route Selection Controllers. GWs 210 are responsible for determining how to route communication data from one subscriber of the communication system 200 to another. The routing determination is made based upon the state variables received by GW 210 from SCS 208 and is described in more detail in conjunction with FIGS. 4–7. GWs 210 may make the routing determination based on the Select Most Available Route method of the preferred embodiment (discussed in conjunction with FIG. 6) or the Select Resequenced First Available Route method of the alternate embodiment (discussed in conjunction with FIG. 7) In other alternate embodiments, routing determinations may be made by SCS 208 or by satellites 202, or any other system element that has information regarding the state variables.

A "subscriber" is defined herein as a system user. FIG. 2 shows "Subscriber Unit" 214 (SU) which is an individual communication terminal which communicates directly with a satellite 101 via a radio link. SUs 214 may be hand-held, portable cellular pagers or telephones adapted to transmit subscriber data to and receive subscriber data from satellites 202. "Subscriber data" is defined herein as data (e.g., voice, paging, or fax data) originating from or terminating at a SU 214.

Figure 3:
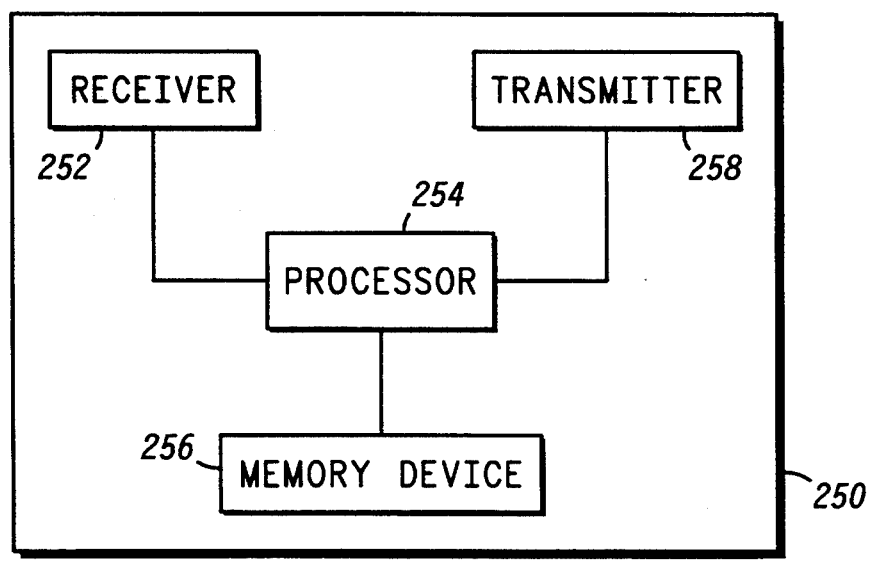
FIG. 3 illustrates a route selection controller in accordance with the present invention.

FIG. 3 illustrates a Route Selection Controller 250 in accordance with the present invention. Route Selection Controller 250 includes Receiver 252 that receives a request to establish a communication path between a source node and a destination node (e.g., SU 214, FIG. 2). Receiver 252 is coupled to Processor 254 that establishes a route list of potential routes between the source node and the destination node. In the preferred embodiment, Processor 254 identifies lists of links for the potential routes in the route list, and extracts link state variables for the communication links in the lists of links, where the link state variables are desirably stored in Memory 256. Processor 254 then determines blocking probabilities and linking probabilities for the communication links in the lists of links, and computes route probabilities for the potential routes by multiplying the linking probabilities for the communication links in the potential routes. Processor 254 then identifies a best route as the route that has a highest route probability, and attempts to establish the communication path between the source node and the destination node along the best route. The preferred embodiment is discussed in detail in connection with FIG. 6.

In an alternate embodiment, Processor 254 identifies lists of links for the potential routes in the route list and determines link residual capacities for the communication links of the lists of links using link state variables that are desirably stored in Memory 256. Processor 254 then determines route bottleneck values for the potential routes by identifying minimum link residual capacities for the potential routes. Processor 254 identifies a best route as the route with a highest route bottleneck value, and attempts to establish the communication path between the source node and the destination node along the best route. The alternate embodiment is discussed in detail in connection with FIG. 7.

Processor 254 attempts to establish the communication path, for example, by transmitting call setup information to a remote GW 210 (FIG. 2) or SU 214 (FIG. 2) using Transmitter 258.

Figure 4:
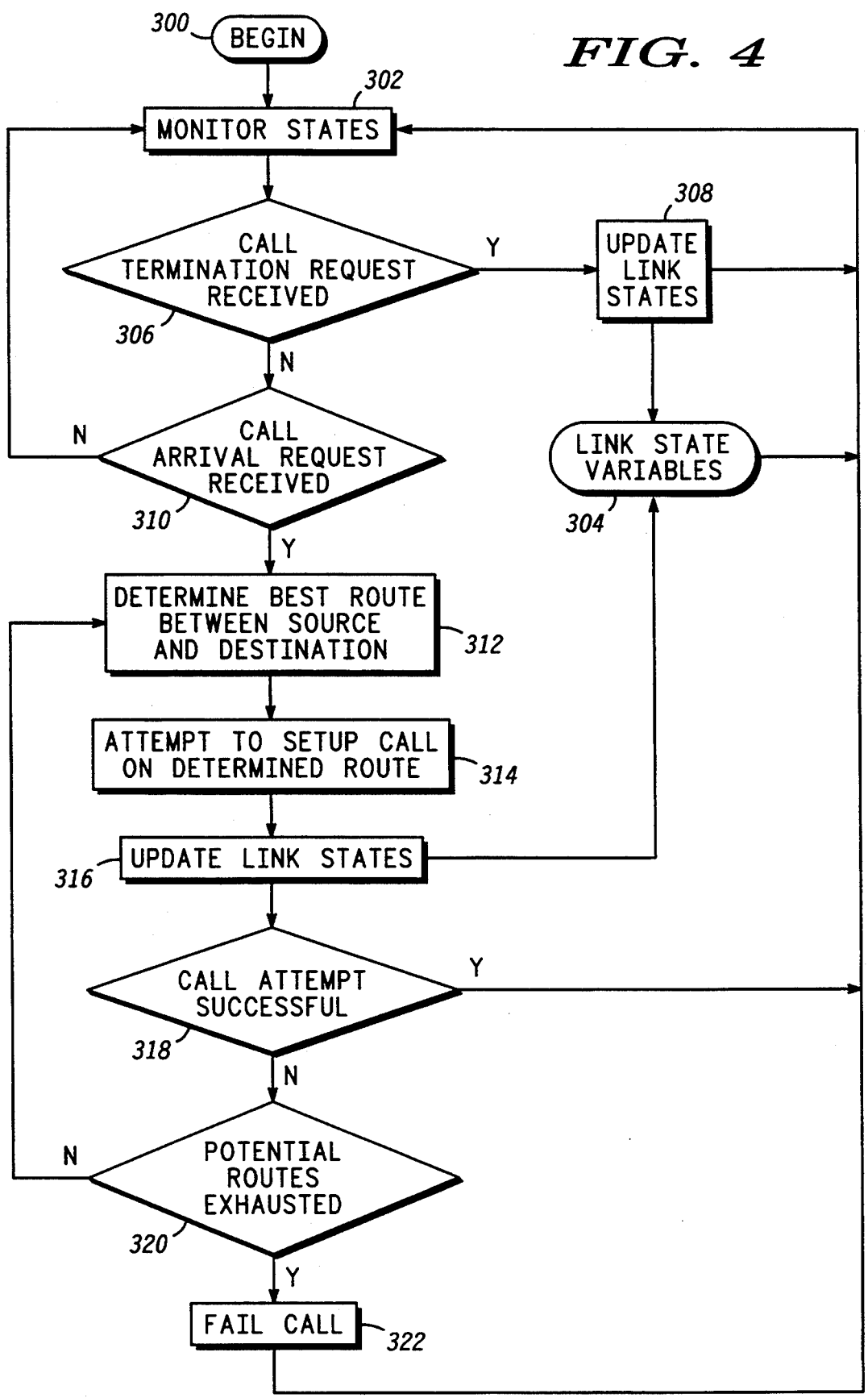
FIG. 4 illustrates a flowchart of a method for monitoring and updating system state variables and selecting data routes in accordance with the present invention.

FIG. 4 illustrates a flowchart of a method for monitoring and updating system state variables and selecting data routes in accordance with the present invention. The method begins (block 300) by performing the Monitor States process (block 302). In the Monitor States process (block 302) the system receives incoming requests from system nodes and monitors the link state variables (block 304). System state changes are triggered by two types of events: a) Call Arrival Requests signifying arrival of a new call into the system, and b) Call Termination Requests signifying completion of an ongoing call.

In the preferred embodiment, the communication nodes that connect each link transmits state information to the Monitor States process (block 302) on a periodic basis (e.g., once per minute).

The method determines (block 306) whether a Call Termination Request is received. When a Call Termination Request is received (block 306), the Update Link States process (block 308) updates the link state variables (block 304) to reflect the fact that one less call is being handled on the links of the terminated call's route. The communication resources consumed along the route used by the call may be freed up. A "BUSY counter" is maintained for each communication link in the system. On call termination, the BUSY counter for each communication link is decremented by one. This reflects the fact that the communication link is carrying one less call after termination After completing Update Link States process (block 308), the method returns to the Monitor States process (block 302). The procedure iterates as shown in FIG. 4.

In an alternate embodiment, system nodes may send telemetry messages to the Update Link States process (block 308) indicating the quantity of calls on the links. The Update Link States process (block 308) may then update the Link State Variables (block 304) based on the telemetry messages.

When no Call Termination Request is received (block 306), the method determines (block 310) whether a Call Arrival Request is received. When no Call Arrival Request is received (block 310), the method returns to the Monitor States process (block 302) and the procedure iterates as shown in FIG. 4. As would be obvious to one of skill in the art based on the description herein, the determination of whether a Call Termination Request is received (block 306) and the determination of whether a Call Arrival Request is received (block 308) may be performed in either order. Alternatively, they may be interrupts to the system and may occur at any time during the method shown in FIG. 4.

When a Call Arrival Request is made, the method uses the most recent version of the state information to determine the best route between the source and destination nodes. A Call Arrival Request includes information about the source and destination nodes. When a Call Arrival Request is received (block 310), the system performs the Determine Best Route process (block 312). Associated with each route is an estimate of its availability (i.e., estimated likelihood that the route has enough resources to carry the new call). The Determine Best Route process (block 312) computes the estimated availability of each route between the source and destination using the current system state information. The result is a list of potential routes with indications of their estimated availability. The Determine Best Route process (block 312) selects the route on the potential route list that is considered the best route at the time. The Determine Best Route process (block 312) is described in more detail in conjunction with FIGS. 5-7.

Next, the Attempt to Setup Call process (block 314) attempts to set up the call using the best route selected in the Determine Best Route process (block 312). Then, the system updates link state variables (block 304) by performing Update Link States process (block 316). The Update Link States process (block 316) updates certain counters associated with each communication link. One updated counter is an "ATTEMPTS counter" that is incremented by one each time an attempt is made to use resources of the link. A "BLOCKS counter" is also associated with each communication link. The BLOCKS counter is incremented by one each time an attempt is made to use resources of the link but the attempt is unsuccessful (i.e., resources are not available at that time and the link is blocked). The system estimate of the availability of a communication link at any time instant is computed as (ATTEMPTS-BLOCKS)/ATTEMPTS. The Update Link States process (block 316) updates the estimate of link availability whenever a call setup request initiates an attempt to utilize the link.

The method then determines (block 318) whether the call attempt is successful. If the call attempt is successful (block 318), the method returns to the Monitor States process (block 42) and the procedure iterates as shown in FIG. 4. If the call attempt is not successful (block 318), the method determines (block 320) whether all potential routes in the route list from the Determine Best Route process (block 312) have been exhausted. If all potential routes have not been exhausted (block 320), the method returns to the Determine Best Route process (block 312) to determine the next best route in the route list. The procedure then iterates as shown in FIG. 4.

If all potential routes in the list have been exhausted (block 320), then the Fail Call process (block 322) ceases to attempt to set up the call (i.e., the call "fails"). The method then returns to the Monitor States process (block 302).

In the preferred embodiment, the system supports a feedback mechanism which gives a quick indication of the outcome of the Call Attempt Successful test (block 318). In certain types of communication systems, however, quick feedback may not be available because of physical or other limitations. Thus in an alternate embodiment, the system may implicitly assume that the call setup along the first route is successful (block 318) and the method may simply return to the Monitor States process (block 302) or perform the Fail Call process (block 322) rather than checking whether all potential routes have been exhausted (block 320).

Figure 5:
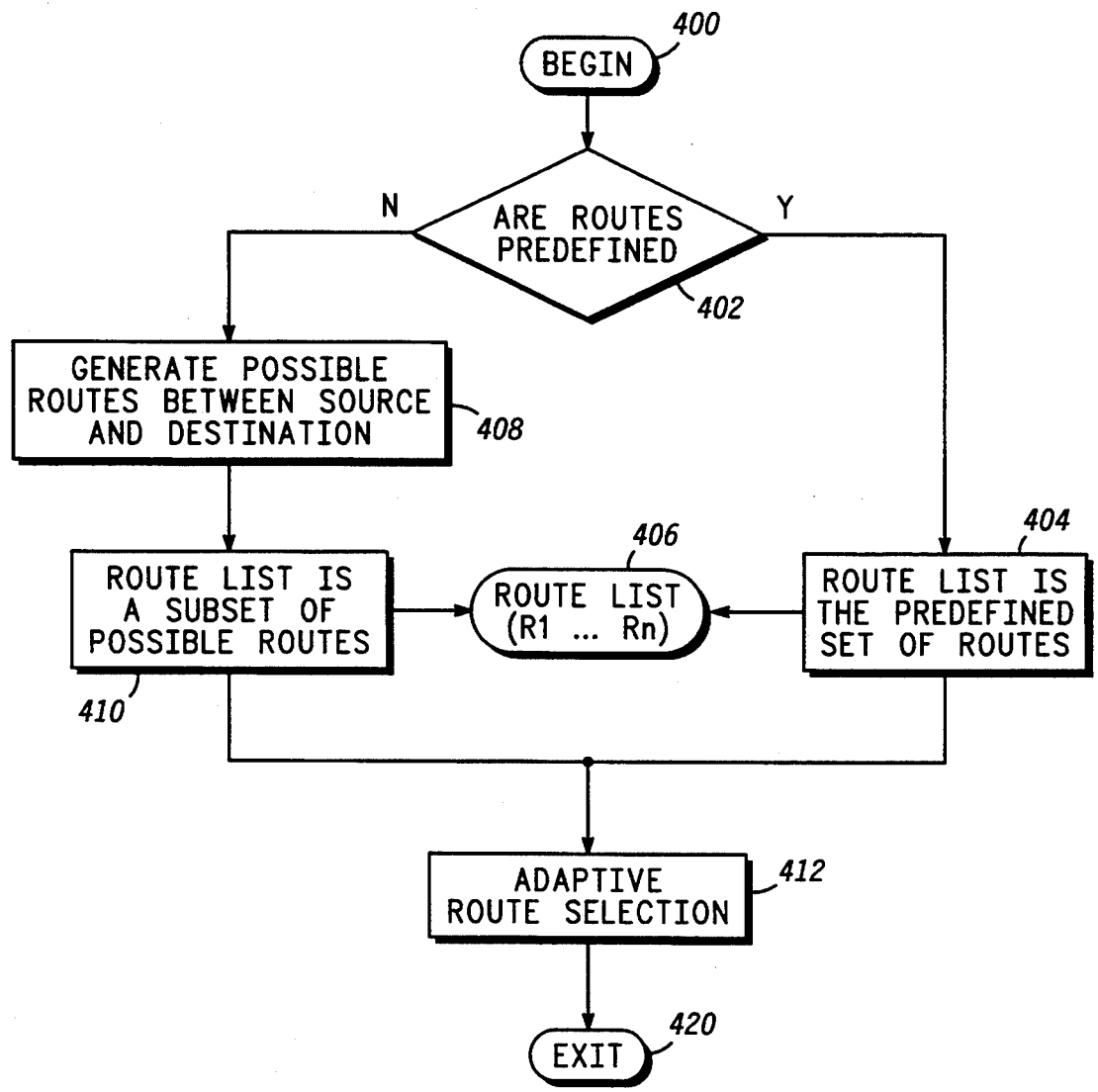
FIG. 5 illustrates a flowchart of a method for determining a best route in accordance with the present invention.

FIG. 5 illustrates a flowchart of a method for performing the Determine Best Route process (block 312, FIG. 4) in accordance with the present invention. The Determine Best Route process begins (block 400) by determining (block 402) whether a route list has been predefined by the communication system. When no route list has been predefined (block 402), the Generate Possible Routes process (block 408) determines possible routes between the source node and the destination node. The Generate Possible Routes process (block 408) may determine all possible routes, or it may limit the possible routes based on some criteria (e.g., do not use more than twelve links in a route). Next, the Route List (block 406) may be set to a subset of all routes between the source node and the destination node (block 410). A number of different criteria can be used in selecting such a subset. These criteria may include, for example, the number of links in the routes from the source node to the destination node, and the cost of routes from the source node to the destination node.

When a route list has been predefined (block 402), the route list (block 406) is set to the predefined set of routes (block 404). After a route list exists, the Adaptive Route Selection process (block 412) is performed. The Adaptive Route Selection process (block 412) determines which route in the Route List (block 406) is considered the best route to attempt a call on. The Adaptive Route Selection process (block 412) is described in more detail in conjunction with FIGS. 6 and 7. The procedure then exits (block 420).

Figure 6:
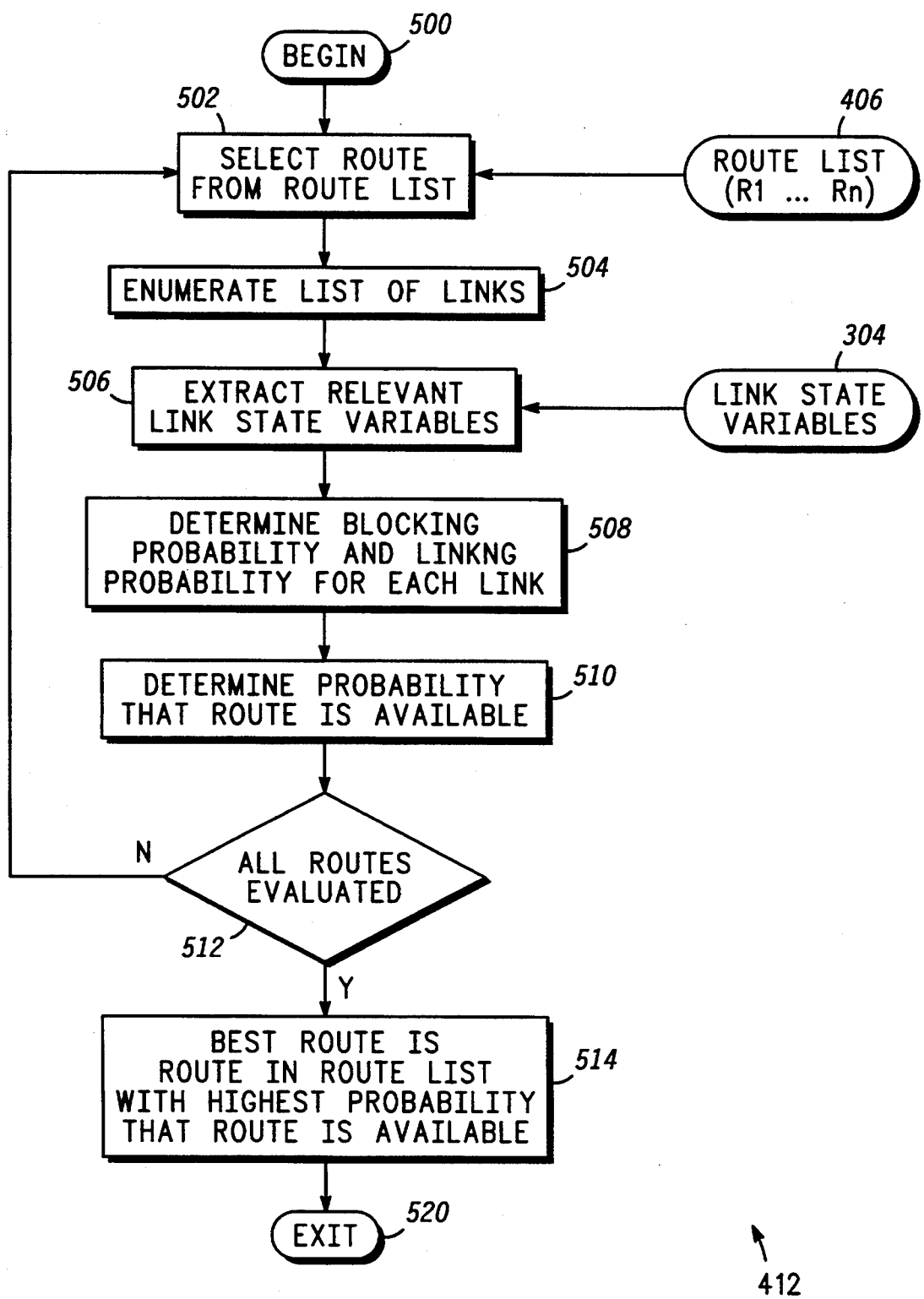
FIG. 6 illustrates a flowchart of a method for adaptively selecting a route based on which route is most available in accordance with the present invention.

FIG. 6 illustrates a flowchart of a method for adaptively selecting a route based on which route is most available in accordance with the present invention. FIG. 6 illustrates the preferred embodiment of the Adaptive Route Selection process (block 412, FIG. 5). The method begins (block 500) by performing the Select Route process (block 502). The Select Route process (block 502) selects one route from the Route List (block 406) and inputs the selected route to the Enumerate List of Links process (block 504). The Enumerate List of Links process (block 94) produces the set of communication links that make up the selected route. Next, the Extract Relevant Link State Variables process (block 506) extracts the values of Link State Variables (block 304) for each communication link in the route. In particular, for each link in the route, the ATTEMPTS and BLOCKS counters are extracted and input to the Determine Blocking Probability and Linking Probability process (block 508). The Determine Blocking Probability and Linking Probability process (block 508) computes the Blocking Probability as the ratio (BLOCKS/ATTEMPTS) and computes the Linking Probability as (1.0-Blocking Probability). A Blocking Probability and a Linking Probability is determined (block 510) for each link in a route.

Next the Determine Probability That Route is Available process (block 510) computes the product of the Linking Probabilities for communication links that make up a particular route. This probability that the route is available is temporarily stored in association with the route. The method then determines (block 512) whether all the routes in Route List (block 406) have been evaluated. When all routes have not been evaluated (block 512), the Select Route from Route List process (block 502) is repeated and the procedure iterates as shown in FIG. 6.

When all routes have been evaluated (block 512), the Best Route is identified (block 514) as the route in the Route List (block 406) with the highest probability that the route is available. The Best Route is the route for which the probability that the route is available is highest among the choices in Route List (block 406). The procedure then iterates as shown.

In an alternate embodiment, the procedure may be performed one time rather than iterating as shown in FIG. 6. In such an embodiment, the Select Route From Route List process (block 502) may select al routes in the Route List (block 406). Next, the Enumerate List of Links process (block 504) may enumerate the links for all routes in the Route List (block 406). Then the Extract Relevant Link State Variables process (block 506) could extract all Link State Variables (block 304) for all the links. The Extract Relevant Link State Variables process (block 506) may not be required to extract Link Variables (block 304) multiple times where links are common to multiple routes. The Determine Blocking Probability and Linking Probability process (block 508) may then determine blocking and linking probabilities for all links of all routes rather than for just one route. Similarly, the Determine Probability that Route Is Available process (block 510) would determine route availability probabilities for all routes. The determination (block 512) whether all routes have been evaluated would be unnecessary in this alternate embodiment.

Figure 7:
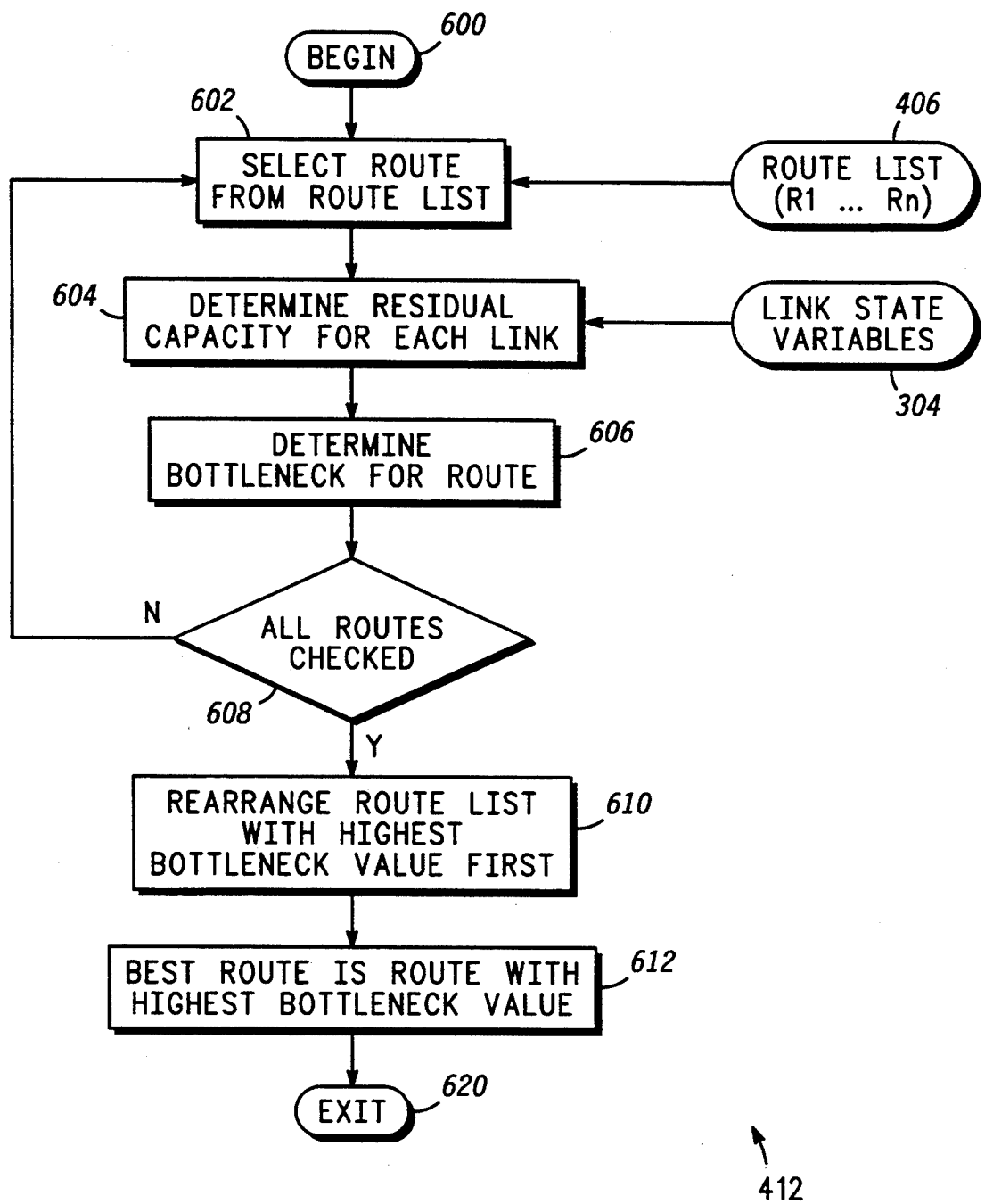
FIG. 7 illustrates a flowchart of a method for adaptively selecting a route based on which resequenced route is available first in accordance with the present invention.

FIG. 7 illustrates a flowchart of a method for adaptively selecting a route based on which resequenced route is available first in accordance with the present invention. FIG. 7 illustrates an alternate embodiment of the Adaptive Route Selection process (block 412, FIG. 5). The method begins (block 600) by performing the Select Route process (block 602). The Select Route process (block 602) selects one route from the Route List (block 406) and inputs the selected route to the Determine Residual Capacity process (block 604).

The Determine Residual Capacity process (block 604) determines the communication links that make up the selected route. For each link in the selected route, the Residual Capacity is calculated. To calculate the Residual Capacity, the method first extracts a CAPACITY value and a BUSY value from the Link State Variables (block 304) for each link in the selected route. The CAPACITY value signifies the amount of resources available on the link. The BUSY value indicates the quantity of resources currently being used on the link.

The Determine Residual Capacity process (block 604) then determines the Residual Capacity of each link as the amount of resources available for new calls at that time. The Residual Capacity is defined as (CAPACITY-BUSY) for the link.

The Determine Bottleneck for Route process (block 606) then identifies the link on the route with the smallest Residual Capacity. This smallest Residual Capacity is called the Bottleneck Value for the route.

Next, the method determines (block 608) whether all routes in the Route List (block 406) have been checked (i.e., a Bottleneck Value has been determined for each route). When all routes have not been checked (block 608), the method returns to the Select Route process (block 602) and the procedure iterates as shown in FIG. 7. When all routes have been checked (block 608), the Rearrange Route List process (block 610) is performed.

The Rearrange Route List process (block 610) sorts the routes in Route List (block 406) and rearranges them according to decreasing Bottleneck Values. Then method then identifies (block 612) the Best Route as the Route with the highest Bottleneck Value. The procedure then exits (block 620).

In an alternate embodiment, the procedure may be performed one time rather than iterating as shown in FIG. 7. In such an embodiment, the Select Route From Route List process (block 602) may select al routes in the Route List (block 406). Next, the Determine Residual Capacity process (block 604) may be performed for the links of all routes in the Route List (block 406). Then the Determine Bottleneck for Route process (block 606) could determine Bottleneck Values for all routes. The determination (block 608) whether all routes have been checked would be unnecessary in this alternate embodiment.

In summary, the invention solves the problem of adaptively selecting a route from a set of potential routes for communication between a pair of nodes. The invention provides simple and effective means for estimating the state of congestion in a communication system by monitoring easily observable and measurable state variables that characterize traffic and load conditions prevalent at discrete times. By continuously monitoring and updating the state, the system adapts very well to dynamically changing network conditions. The adaptive route selection process makes excellent use of system resources and operates in a way that significantly improves the traffic handling capacity of the network for a specified level of system blocking performance. Additionally, the invention enables the communication system to be very robust in the presence of congestion and traffic overload presented to the system and is very resilient in the presence of extreme conditions such as failures of communication links and components.

The improvements have been extensively simulated in experiments and compared with other methods for solving route selection problems. The invention provides extremely simple and low-cost mechanisms for improving the efficient utilization of communication system resources. These can lead to increased revenues because of the improved efficiency of system operation. The invention is applicable in a wide variety of communication systems including those where instantaneous feedback information about outcome of route selection decisions may not be available (a situation typical of many satellite-based communication systems). The invention has all the advantages one may desire in one method and is distinctly superior to any known method in the prior art.

What is claimed is:

1. In a communication system, a method for establishing a communication path over a route between a source node and a destination node that is non-adjacent to the source node, wherein the route comprises a series of nodes connected by communication links through which information may be transferred from the source node to the destination node, wherein the communication system has one or more route selection controllers and multiple nodes that are capable of establishing the communication links with adjacent nodes, the method performed by a route selection controller comprising steps of:
   a. updating link state variables when call termination requests and call arrival requests are received, wherein the link state variables describe numbers of calls being supported by the communication links, and the call termination requests and the call arrival requests indicate that the numbers of calls are changing;
   aa. receiving a call arrival request which indicates that the source node wishes to establish the communication path between the source node and the destination node;
   b. based on the call arrival request, establishing a route list of one or more potential routes between the source node and the destination node, wherein each of the potential routes comprises a set of the communication links;
   c. determining a best route from the route list based on the link state variables for the set of communication links comprising each of the potential routes; and
   d. making an attempt to establish the communication path between the source node and the destination node along the best route.

2. The method as claimed in claim 1 wherein step (a) comprises a step of updating the link state variables based on received telemetry from the multiple nodes that describe current link state variables.

3. The method as claimed in claim 1 wherein the link state variables comprise a busy counter, and step (a) comprises a step of updating the link state variables by incrementing the busy counter when a new communication path is requested and decrementing the busy counter when an existing communication path is terminated.

4. The method as claimed in claim 1 wherein step (b) comprises a step of establishing the route list based on a predefined set of routes between the source node and the destination node.

5. The method as claimed in claim 1 wherein step (b) comprises steps of:
   b.1. generating a list of the potential routes between the source node and the destination node; and
   b.2. establishing the route list as a subset of the list of the potential routes.

6. The method as claimed in claim 1 wherein step (c) comprises steps of:
   c.1. identifying a list of links for each of the potential routes in the route list;
   c.2. extracting the link state variables for the communication links in the list of links for each of the potential routes;
   c.3. determining linking probabilities for the communication links in the list of links for each of the potential routes, wherein a linking probability equals one minus a current ratio of blocked call attempts to total call attempts for a link;
   c.4. computing route probabilities for the potential routes by multiplying the linking probabilities for each of the potential routes; and
   c.5. identifying the best route as the route that has a highest route probability.

7. The method as claimed in claim 1 wherein step (c) comprises steps of:
   c.1. determining link residual capacities of the communication links for the potential routes in the route list based on the link state variables, wherein the link residual capacities describe quantities of available resources on each of the communication links;
   c.2. determining mute bottleneck values for the potential routes based on the link residual capacities for each of the potential routes, wherein a route bottleneck value is a smallest link residual capacity currently along a potential route; and
   c.3. identifying the best route as the potential route with a highest route bottleneck value.

8. The method as claimed in claim 7 wherein step (c.3) comprises steps of:
   c.3.1. creating a rearranged route list where the potential routes are arranged such that a highest sequenced route is the route with the highest route bottleneck value and a lowest sequenced route is the route with a lowest route bottleneck value; and
   c.3.2. identifying the best route as the highest sequenced route.

9. A method as claimed in claim 1 further comprising the steps of:
   e. determining whether the attempt to establish the communication path is successful;
   f. when the attempt is not successful, determining whether further attempts have been made on all the potential routes on the route list;
   g. when the further attempts have been made on all the potential routes, ceasing any attempt to establish the communication path; and
   h. when the further attempts have not been made on all the potential routes, making the attempt to establish the communication path on a next best route and, repeating steps e–h.

10. In a communication system, a method for establishing a communication path over a route between a source node and a destination node that is non-adjacent to the source node, wherein the route comprises a series of nodes connected by communication links through which information may be transferred from the source node to the destination node, wherein the communication system has one or more route selection controllers and multiple nodes that are capable of establishing the communication links with adjacent nodes, the method performed by a route selection controller comprising steps of:
   a. receiving a request to establish the communication path between the source node and the destination node;
   b. establishing a route list of one or more potential routes between the source node and the destination node as a result of the request;
   c. identifying a list of links for the potential routes in the route list;
   d. extracting link state variables for the communication links in the list of links, wherein the link state variables are based on call requests received by the nodes and the link state variables describe quantities of calls being handled on the communication links;

e. determining linking probabilities for the communication links in the list of links based on the link state variables, wherein a linking probability equals one minus a current ratio of blocked call attempts to total call attempts for a link;

f. computing mute probabilities for the potential routes by multiplying the linking probabilities for communication links in the potential routes;

g. identifying the best route as the potential route that has a highest route probability; and h. making an attempt to establish the communication path between the source node and the destination node along the best route.

11. The method as claimed in claim 10 wherein step (b) comprises a step of establishing the route list where the route list is predetermined.

12. The method as claimed in claim 10 wherein step (b) comprises a step of utilizing one or more route selection criteria in establishing the route list.

13. The method as claimed in claim 10 further comprising steps of:
  i. determining whether the attempt to establish the communication path is successful;
  j. when the attempt is not successful, determining whether further attempts have been made on all the potential routes on the route list;
  k. when the further attempts have been made on all the potential routes, ceasing any attempt to establish the communication path; and
  l. when the further attempts have not been made on all the potential routes, making the attempt to establish the communication path on a next best route and, repeating steps i–l.

14. In a communication system, a method for establishing a communication path over a route between a source node and a destination node that is non-adjacent to the source node, wherein the route comprises a series of nodes connected by communication links through which information may be transferred from the source node to the destination node, wherein the communication system has one or more route selection controllers and multiple nodes that are capable of establishing the communication links with adjacent nodes, the method performed by a route selection controller comprising steps of:

a. receiving a request to establish the communication path between the source node and the destination node;

b. establishing a route list of one or more potential routes between the source node and the destination node as a result of the request;

c. identifying a list of links for each Of the potential routes in the route list;

d. determining link residual capacities for the communication links in the list of links for each of the potential routes based on link state variables, wherein the link residual capacities describe quantities of available resources on each of the communication links, and wherein the link state variables are based on call requests received by the nodes and the link state variables describe quantities of calls being handled on the communication links;

e. determining route bottleneck values for the potential routes based on the link residual capacities for each of the potential routes, wherein a route bottleneck value is a smallest link residual capacity currently along the route;

f. identifying a best route as the route with a highest route bottleneck value; and g. making an attempt to establish the communication path between the source node and the destination node along the best route.

15. The method as claimed in claim 14 wherein step (b) comprises a step of establishing the route list where the route list is predetermined.

16. The method as claimed in claim 14 wherein step (b) comprises a step of utilizing one or more route selection criteria in establishing the route list.

17. The method as claimed in claim 14 wherein step (f) comprises steps of:
  f.1. creating a rearranged route list where the potential routes are arranged such that a highest sequenced route is the route with the highest route bottleneck value and a lowest sequenced route is the route with a lowest route bottleneck value; and
  f.2. identifying the best route as the highest sequenced route.

18. A method as claimed in claim 14 further comprising the steps of:
  h. determining whether the attempt to establish the communication path is successful;
  i. when the attempt is not successful, determining whether further attempts have been made on all the potential routes on the route list;
  j. when the further attempts have been made on all the potential routes, ceasing any attempt to establish the communication path; and
  k. when the further attempts have not been made on all the potential routes, making the attempt to establish the communication path on a next best route and, repeating steps h–k.

19. A communication system comprising multiple nodes that are capable of establishing communication links with adjacent nodes, and one or more route selection controllers, each of the route selection controllers comprising:

means for receiving a request to establish a communication path between a source node and a destination node;

means, coupled to the means for receiving the request, for establishing a route list of one or more potential routes between the source node and the destination node based on the request, identifying a list of links for each of the potential routes in the route list, extracting link state variables for the communication links in the list of links for each of the potential routes, wherein the link state variables are based on call requests received by the nodes and the link state variables describe quantities of calls being handled on the communication links, determining linking probabilities for the communication links in the list of links for each of the potential routes, wherein a linking probability equals one minus a current ratio of blocked call attempts to total call attempts for a link, computing route probabilities for the potential routes by multiplying the linking probabilities for the communication links in the potential routes, identifying a best route as the route that has a highest route probability, and attempting to establish the communication path between the source node and the destination node along the best route;

means, coupled to the means for establishing the route list, for storing the link state variables; and means, coupled to the means for storing, for attempting call setup.

20. A communication system comprising multiple nodes that are capable of establishing communication links with adjacent nodes, and one or more route selection controllers, the route selection controllers comprising:

means for receiving a request to establish a communication path between a source node and a destination node;

means, coupled to the means for receiving the request, for establishing a route list of one or more potential routes between the source node and the destination node based on the request;

means for identifying a list of links for each of the potential routes in the route list;

means for determining link residual capacities for the communication links of the list of links for each of the potential routes based on link state variables, wherein the link residual capacities describe quantities of available resources on each of the communication links, and wherein the link state variables are based on call requests received by the nodes and the link state variables describe quantities of calls being handled on the communication links;

means for determining route bottleneck values for the potential routes based on the link residual capacities for each of the potential routes, wherein a route bottleneck value is a smallest link residual capacity currently along the route;

means for identifying a best route as the route with a highest route bottleneck value, and attempting to establish the communication path between the source node and the destination node along the best route;

means, coupled to the means for establishing the route list, for storing the link state variables; and means, coupled to the means for storing, for attempting call setup.

21. A communication system comprising multiple nodes that are capable of establishing communication links with adjacent nodes, and one or more route selection controllers, the one or more route selection controllers comprising:

a receiver that receives a request to establish a communication path between a source node and a destination node;

a processor, coupled to the receiver, that establishes a route list of one or more potential routes between the source node and the destination node based on the request, identifies a list of links for each of the potential routes in the route list, extracts link state variables for the communication links in the list of links for each of the potential routes, wherein the link state variables are based on call requests received by the nodes and the link state variables describe quantities of calls being handled on the communication links, determines linking probabilities for the communication links in the list of links for each of the potential routes, wherein a linking probability equals one minus a current ratio of blocked call attempts to total call attempts for a link, computes route probabilities for the potential routes by multiplying the linking probabilities for the communication links in the potential routes, identifies a best route as the route that has a highest route probability, and makes an attempt to establish the communication path between the source node and the destination node along the best route;

a memory device, coupled to the processor, that stores the link state variables; and a transmitter, coupled to the processor, that the processor uses to attempt to establish the communication path.

22. A communication system comprising multiple nodes that are capable of establishing communication links with adjacent nodes, and one or more route selection controllers, the one or more route selection controllers comprising:

a receiver that receives a request to establish a communication path between a source node and a destination node;

a processor, coupled to the receiver, that establishes a route list of one or more potential routes between the source node and the destination node based on the request, identifies a list of links for each of the potential routes in the route list, determines link residual capacities for the communication links of the list of links for each of the potential routes based on link state variables, wherein the link residual capacities describe quantities of available resources on each of the communication links, and wherein the link state variables are based on call requests received by the nodes and the link state variables describe quantifies of calls being handled on the communication links, determines route bottleneck values for the potential routes based on the link residual capacities for each of the potential routes, wherein a route bottleneck value is a smallest link residual capacity currently along the route, identifies a best route as the route with a highest route bottleneck value, and makes an attempt to establish the communication path between the source node and the destination node along the best route;

a memory device, coupled to the processor, that stores the link state variables; and a transmitter, coupled to the processor, that the processor uses to attempt to establish the communication path.

* * * * *

UNITED STATES PATENT AND TRADEMARK OFFICE
CERTIFICATE OF CORRECTION

PATENT NO. : 5,452,294
DATED : September 19, 1995
INVENTOR(S) : Kadathur S. Natarajan It is certified that error appears in the above-indentified patent and that said Letters Patent is hereby corrected as shown below:

In column 13, claim 10, line 9, "mute" should be --route--.

In column 13, claim 14, line 55, "Of" should be --of--.

Signed and Sealed this

Thirtieth Day of April, 1996

Attest:

BRUCE LEHMAN

Attesting Officer  Commissioner of Patents and Trademarks